United States Patent
Fang et al.

(10) Patent No.: US 6,345,941 B1
(45) Date of Patent: Feb. 12, 2002

(54) THREAD MILLING TOOL HAVING HELICAL FLUTES

(75) Inventors: X. Daniel Fang, Franklin; David J. Wills, Brentwood; Clarence E. Blackburn, Lebanon, all of TN (US)

(73) Assignee: ATI Properties, Inc., Albany, OR (US)

( * ) Notice: Subject to any disclaimer, the term of this patent is extended or adjusted under 35 U.S.C. 154(b) by 0 days.

(21) Appl. No.: 09/511,037

(22) Filed: Feb. 23, 2000

(51) Int. Cl.$^7$ .................................. B23G 5/18
(52) U.S. Cl. ..................... 409/74; 407/24; 408/222
(58) Field of Search .................. 409/65, 74, 75, 409/76, 78, 67, 68; 408/222, 226; 470/198; 407/24, 29

(56) References Cited

U.S. PATENT DOCUMENTS

| | | |
|---|---|---|
| 4,761,844 A | 8/1988 | Turchan |
| 4,831,674 A * | 5/1989 | Bergstrom et al. ............ 409/74 |
| 4,934,040 A * | 6/1990 | Turchan ...................... 409/74 |
| 4,943,191 A * | 7/1990 | Schmitt ....................... 409/74 |
| 5,098,232 A * | 3/1992 | Benson ........................ 407/24 |
| 5,413,438 A | 5/1995 | Turchan |
| 5,429,459 A | 7/1995 | Palm |
| 5,704,736 A * | 1/1998 | Giannetti ..................... 407/43 |
| 5,733,078 A | 3/1998 | Matsushita et al. |

OTHER PUBLICATIONS

Tool and Manufacturing Engineering Handbook, Fourth Edition, vol. 1, Machining, Society of Manufacturing Engineers, Chapter 12, pp. 110–114.*
Beard, Thomas L., "The INS and OUTS of Thread Milling; Emphasis: Hole Making; Interview", *Modern Machine Shop*, Gardner Publications, Inc., (1991).
Koelsch, James R., "Thread Milling Takes On Tapping", Manufacturing Engineering, (1995).
Johnson, Mark, "Tapping", Traditional Machining Processes, pp. 255–265 (1997).
"Thread Milling", Traditional Machining Processes, pp. 268–269 (1997).
Scientific Cutting Tools, "The Cutting Edge," (1998), printed on Feb. 1, 2000.
Helical Carbide Thread Mills, Schmarje Tool Company (1998).

* cited by examiner

*Primary Examiner*—Daniel W. Howell
(74) *Attorney, Agent, or Firm*—P. J. Viccaro

(57) ABSTRACT

A thread milling tool includes a proximal shank portion and a distal cutting portion. The cutting portion includes at least one thread milling tooth and at least one flute oriented helically, or spirally, about a rotational axis of the tool. The helix angle of the thread milling tool of at least 20°. The cutting portion may be configured to form internal or external threads in a workpiece as the cutting portion moves relative to the workpiece.

10 Claims, 7 Drawing Sheets

THREAD MILLING TOOL HAVING HELICAL FLUTES

CROSS REFERENCE TO RELATED APPLICATIONS

Not applicable.

STATEMENT REGARDING FEDERALLY SPONSORED RESEARCH OR DEVELOPMENT

Not applicable.

TECHNICAL FIELD AND INDUSTRIAL APPLICABILITY OF THE INVENTION

The present invention relates to cutting tools for milling internal or external threads in metallic workpieces or workpieces constructed of other materials. The present invention more particularly relates to thread milling tools having one or more helical flutes on a cutting portion of the tools. The present invention may be incorporated on thread milling tools for milling, for example, straight or tapered threads.

BACKGROUND OF THE INVENTION

Thread cutting tools are known for cutting either internal threads in predrilled holes in a workpiece or external threads on a perimeter of a workpiece. These thread milling tools are typically known as "thread mills". A typical thread mill has a shank portion and a thread cutting portion. Thread mills generally produce higher quality threaded workpieces when compared to other threading tools, such as taps.

The thread cutting portion of a thread mill may include thread-milling teeth and flutes. A typical thread mill may have between two to four flutes but may include more than four flutes for certain sizes and milling applications. Flutes may be provided on thread mills to provide cutting edges and to channel the chips produced during the milling operation out of a hole that is being threaded. The flutes defined in thread mills may be straight or oriented in a spiral or helical pattern having either a right-handed or a left-handed direction. Straight flutes lie generally parallel to the longitudinal axis of the thread mill extending from the end of the cutting portion and along the cutting portion. Helical or spiral flutes may be defined by a helix angle and wrap around the external surface of the thread mill. As used herein, the helix angle is the constant angle between and the central axis of the cutting tool or any line parallel to the central axis. Those of ordinary skill will understand and may readily determine the helix angle for a particular cutting tool.

Helical flutes defined in the cutting portion of a thread mill may produce a lifting action on the chips produced during the threading operation. The lifting action tends to force the chips through the flute and out of the hole that is being threaded. Helical flutes may also be advantageous, for example, when threading holes having keyways or other interruptions. The helical arrangement of the flute causes the cutting teeth to meet the interruption progressively, thus cutting more smoothly and being less subject to shock.

The thread-cutting teeth of thread mills may be configured to form threads defined by ISO or NPT standards or may have any other thread shape. The thread-cutting teeth have a configuration complementary to that of the threads to be formed on the inner surface of the bore or the external surface of the workpiece. The rows of cutting teeth are separated by the flutes defined in the cutting portion of the thread mill.

The shank portion of the thread mill may be mounted on, for example, the spindle of a milling machine, machining center, or computer numerically controlled milling machine. Thread mills are generally used on machines allowing motion along three axes, which allows the thread mill to move in the helical path required of the thread mill in operation. The thread mill rotates about its longitudinal axis, rotates around the center of the perimeter of the workpiece to be threaded, and also moves in an axial direction relative to the workpiece.

Multi-fluted thread mills work similarly to threading taps, but their design and operation differ in many respects. A tap operates primarily like a reamer that may be plunged very quickly into the workpiece to form threads. The thread form profile on the outside diameter of the tap is ground in with a spiral pattern that equals the pitch of the desired resultant thread pattern on the workpiece. Thus, the tap is literally pulled forward as it is twisted into the workpiece and, therefore, the feed rotational direction usually must be reversed in order to remove the tap from a blind threaded bore. Typically, two or three taps must be used to produce a complete thread. Thread mills, however, are milling tools, and they remove material chip-by-chip as the threads are milled in the workpiece. Thread mills usually have smaller diameters than a bore in a workpiece to be threaded. Although the thread profile is also ground on the outside diameter of thread mills, similar to taps, the threads are in line with each other and are not helically oriented. Therefore, a thread mill must be helically interpolated into the workpiece to form the desired resultant helical threads. Thread mills have cutting edges on each thread-cutting tooth are formed with a rake angle on the cutting portion of the thread milling tool.

Examples of known thread milling tools include the combined hole making and threading tools described in U.S. Pat. Nos. 5,413,438 and 4,761,844. A combined hole making and thread milling tool is provided with an elongated straight body having a shank at one end, and a hole drilling portion and a thread making portion along a working portion of the tool. The thread making portion of the tool has a maximum diameter equal to the maximum diameter of the hole drilling means so that the thread making portion can enter the hole without interference while the hole is being drilled. The thread making portion of the tool may have straight or helically disposed flutes. The bore is formed by the hole drilling portion and is then threaded using the thread making portion by combination of simultaneous rotary, axial, and orbital motion of the tool. The orbital motion of the tool is a movement of the axis of the tool about the center line of the hole, namely, along a circle whose center lies on a center line of the hole. The combined rotary, axial, and orbital motions of the combined tool cuts an internal thread on the inner surface of the hole.

U.S. Pat. No. 5,733,078 provides a drilling and thread milling tool wherein the cutting portion of the tool includes thread-milling teeth on an outer circumferential surface and also includes one or more end-cutting edges on a distal face of the tool. Each end-cutting edge has a maximum diameter which is intermediate in length to a minor diameter and a major diameter of the thread-milling teeth on the same tool. This drilling and thread-milling tool allows for the formation of a threaded hole close to an edge of the workpiece by reducing the minimum required wall thickness between the major diameter of the thread being generated and the edge of the workpiece.

In order for thread milling tools to operate efficiently, the chips generated during threading must be efficiently removed when a hole in a workpiece is being threaded. Chip entrapment or inefficient chip removal is a major cause of increased power consumption, reduced quality of the milled threads and tool wear. Thread mills used for threading blind bores are typically designed with flutes so that the chips are lifted out of the hole or, if enough clearance can be provided at the bottom of the hole, the chips are pushed ahead of the cutting tool. When the flute design of the cutting tool is such that the chips are lifted out of the hole by the lifting action of the flutes, it may also be helpful to direct a jet of cutting fluid into the bore through an internal passage within the tool. This flow of fluid both cools the workpiece and cutting tool and also assists in flushing the chips from the bore through the flutes. By improving upon the flute design of conventional thread mills, increases in threading efficiency and thread quality may be achieved.

Accordingly, it would be advantageous to provide an improved design for a thread mill that will more efficiently convey chips generated during threading operation. In that way, the efficiency of the threading operation will be improved, and the quality of the resulting threads also will be enhanced.

SUMMARY OF THE INVENTION

The present invention provides an improved thread milling tool for generating internal and/or external threads in a workpiece. The thread milling tool of the present invention includes a proximal shank portion and a distal cutting portion. The cutting portion of the thread milling tool comprises at least one thread milling tooth. At least one helically oriented flute is defined in the cutting portion. The helix angle of the flute defined in the cutting portion is greater than or equal to 20°.

A thread milling tool according to the present invention may also include a tapered region defined on the cutting portion wherein a diameter of the cutting portion tapers along an axial direction on at least a portion of the thread milling tool. The proximal shank portion may be attached to a device, such as, for example, a milling machine, a machining center, or a computer numerically controlled lathe with milling capabilities, that may translate the tool along a helically interpolated path appropriate to form the desired threads. The cutting portion may form internal or external threads in the workpiece as the cutting portion moves relative to the workpiece.

The thread milling tool of the present invention provides enhanced milling performance during thread formation relative to prior art helically fluted thread mills, which have flutes with smaller helix angles. The thread milling tool of the present invention forms more accurate thread parameters and thread profiles, resulting in a smoother threading process including smoother chips, and produces a generally smoother surface on threaded holes. The enhanced performance of the thread milling tool of the present invention may reduce the cutting forces necessary and vibrations created in the thread milling operation and, therefore, may enhance tool life and the tendency of chipping of the thread milling tool during threading.

BRIEF DESCRIPTION OF THE DRAWINGS

Features and advantages of the present invention may be better understood by reference to the accompanying drawings in which.

DETAILED DESCRIPTION OF EMBODIMENTS OF THE INVENTION

Figure 1:
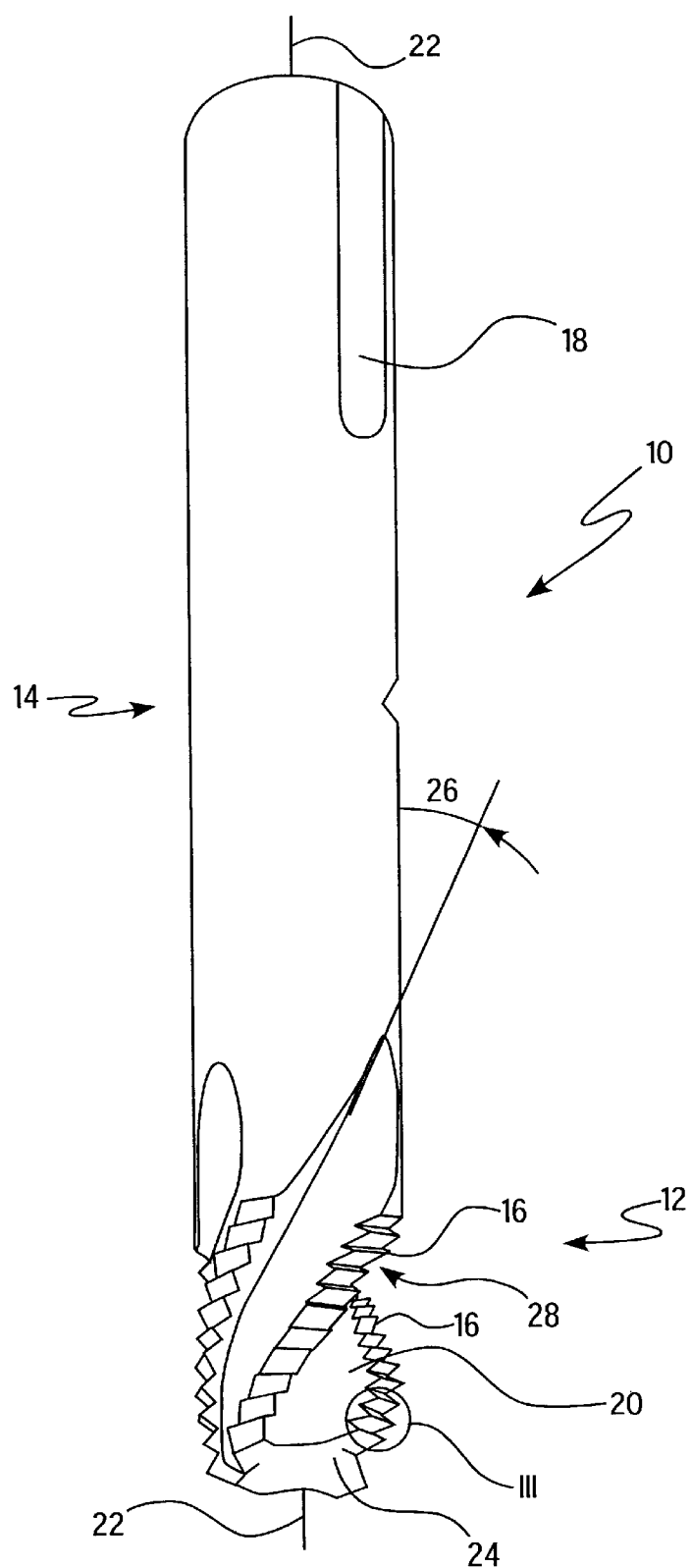
FIG. 1 is a perspective view of an embodiment of a thread milling tool constructed according to the present invention.

The present invention is directed to a thread milling tool or "thread mill" for creating internal and/or external threads in metallic and other work pieces and which improves upon the performance of prior art thread milling tools. An embodiment of a thread milling tool constructed according to the present invention, designated generally as 10, is depicted in FIG. 1. The thread milling tool 10 is adapted for providing internal threads in holes in a work piece, while the tool's helical flutes, described below, simultaneously produce a lifting action which forces all or a portion of the chips through the flute and out of the hole that is being threaded. The thread milling tool 10 may be fabricated from a solid carbide material or from any other suitable material. Such other suitable materials may include, for example, high speed steels, spring steels, solid carbide material with a steel core, tool steels, or sintered steels. Other materials that may be used to construct the thread milling tool 10 will be apparent to those of ordinary skill in the art and, as is known in the art, the suitability of a particular material will be at least partially dependent on the intended application of the thread milling tool.

The thread milling tool 10 includes a cutting portion 12 and a shank portion 14. The cutting portion is of a tapered design and includes a plurality of flutes 16. As is known in the art, the tapered design of the cutting portion is employed to produce tapered threads in at least a portion of a hole in a workpiece. The particular taper parameters of the cutting portion may be specified by National Pipe Thread or other industry standards. The shank portion 14 of the thread milling tool 10 is constructed so that the thread milling tool 10 may be suitably mounted to the spindle of a machine tool such as, for example, a milling machine or a machining center. A locating slot, such as locating slot 18, may be provided on the shank portion 14 to ensure that the thread milling tool 10 is mounted to the spindle of a machine tool in a correct orientation. The shank portion 14 may be of a standard design, such as a Weldon shank, to ensure consistency of the milling operation after tool changes. The cutting portion 12 includes a plurality of banks of cutting studs or teeth 20, which are separated by the flutes 16. The flutes 16 are helically oriented relative to a central rotational axis 22 of the thread milling tool 10. The arrangement of the helical flutes 16 and cutting teeth 20 is such that a plurality of individual banks of teeth are disposed in a helical orientation relative to the central rotational axis of the thread milling tool 10 in a direction progressing from a terminal end 24 of the cutting portion 12 toward the shank portion 14. The helical flutes 20 form a helix angle, such as angle 26, which is the angle between the central axis 22 of the thread milling tool 10 or a line parallel to the central axis 22 and the flutes 16.

Figure 2:
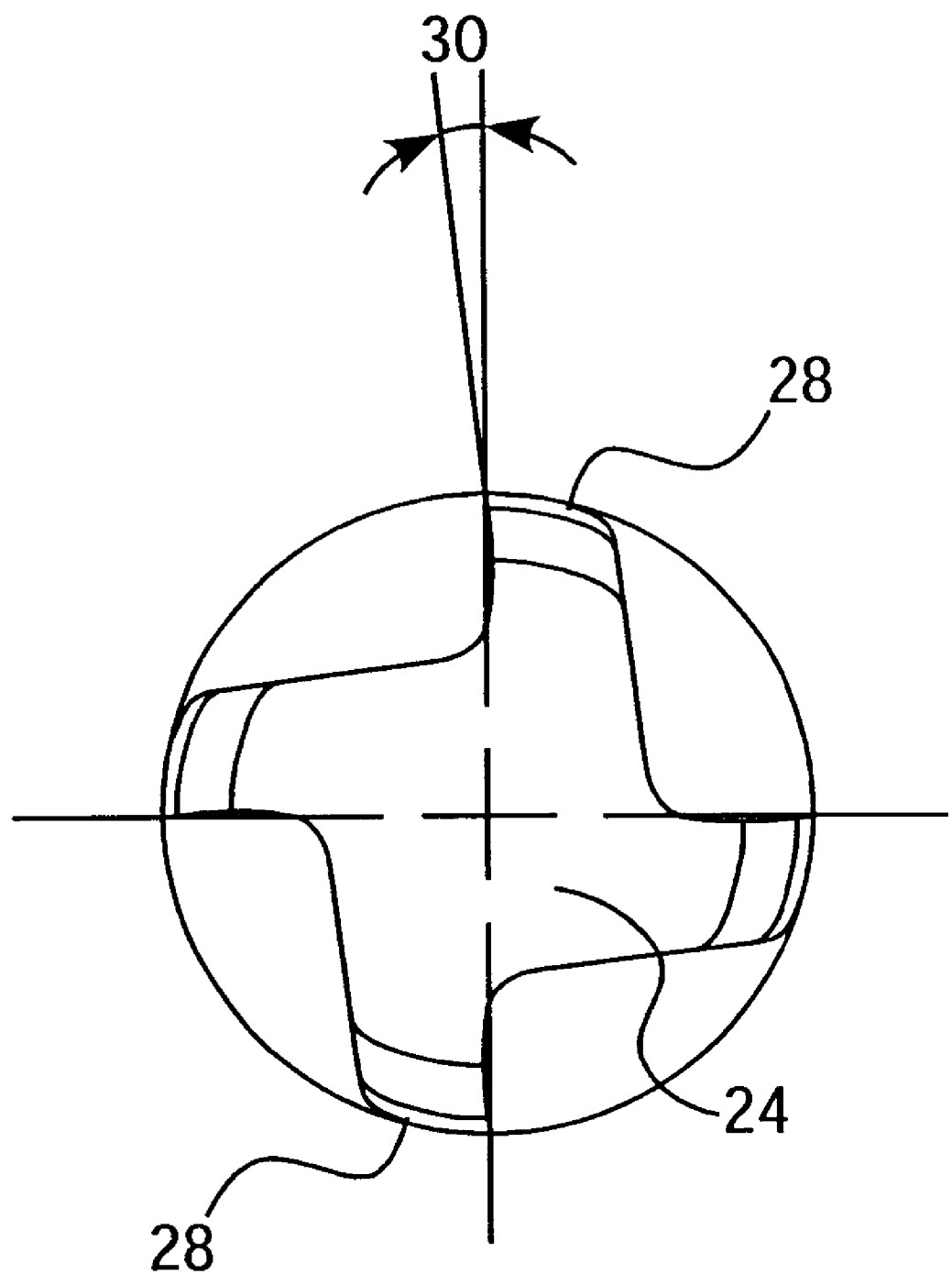
FIG. 2 is an end view of the thread milling tool illustrated in FIG. 1, showing the rake angle formed by the leading edge of a thread form on the cutting portion of the thread milling tool.
Figure 3:
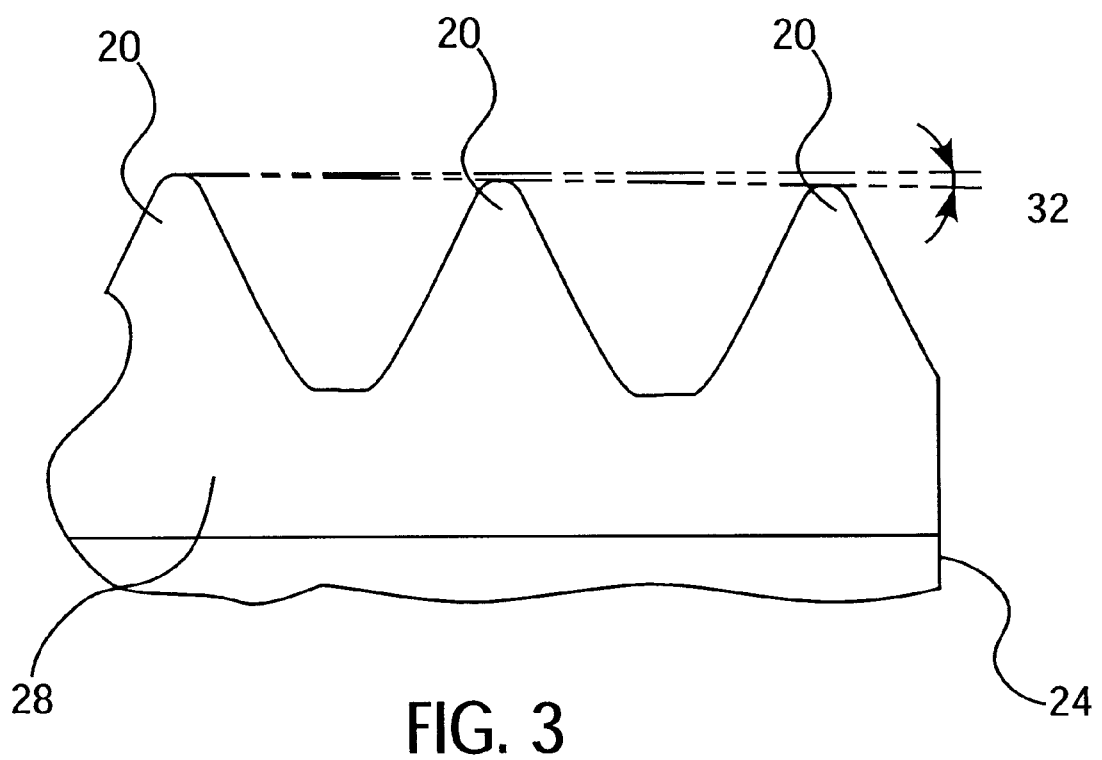
FIG. 3 is an enlarged view generally of region III of FIG. 1, showing the taper angle of the terminal region of a thread form of the thread milling tool illustrated in FIG. 1.

The banks of cutting teeth 16 are configured to delineate several thread forms 28, and the thread forms may have various configurations defined by ISO or other standards. Each of the thread forms 28 defines a rake angle, angle 30 in FIG. 2, and also may define a taper angle, angle 32 in FIG. 3. With reference to FIG. 3, the taper angle 32 of the thread milling tool 10 is defined by a successive decrease in the distance between the central axis 22 of the tool 10 and the crest of individual cutting teeth 16 as the cutting teeth 16 approach the terminal end 24 of the thread milling tool 10.

Accordingly, the thread milling tool 10 is of a solid cemented carbide material, is of a tapered configuration, and includes helical flutes defined about the cutting portion of the thread milling tool. As further described below, the thread milling tool 10 includes a novel helix angle that provides distinct improvements relative to both thread milling tools having straight flutes (i.e., having flutes lying substantially parallel to the central axis of the tool or with a helix angle of 0°) and thread milling tools including helical flutes defining a conventional helix angle. Specifically, the helix angle of thread milling tool 10 of the present invention is greater than the helix angle of known helically fluted thread milling tools, which have a helix angle less than 20°. The increased helix angle of the present invention provides improved machining performance as threads are milled into the workpiece. The improved machining performance is exemplified by better chip control, better chip evacuation, smoother threading, longer tool life, reduced power consumption, and an improved quality of the threads provided on the threaded workpiece. The threads produced by the thread mill of the present invention have less variation when compared to the "ideal" threads as defined by industry standards than the threads produced by prior art thread mills.

The number of helically oriented flutes provided on thread milling tools constructed according to the present invention may be any suitable number, and is preferably from two to six. The actual number of flutes provided will depend largely on the diameter of the thread milling tool and its intended application. The taper angle of the thread milling tool of the present invention, as described above, may be from 0° (untapered) up to any suitable taper angle. Preferably, thread milling tools constructed according to the present invention are of a tapered construction and have a taper angle no greater than 5°. The appropriate taper angle will, of course, depend on the specifications of the threads to be produced, and such specifications are well known to those having ordinary skill in the thread milling arts. The top rake angle, as described above, may be any suitable rake angle as is known in the art, and preferably is from 10° to 35°. The thread forms may be of any suitable design, many of which are described in industry specifications, including BSPT, NPT, and NPTF specifications, all of which are ISO standards.

The helix angle of a thread milling tool constructed according to the present invention may be any suitable angle greater than or equal to 20°. Preferably, the helix angle is within the range of 20° to 40°, inclusive.

During the threading operation, the thread milling tool is simultaneously rotated about its central axis and moved axially to mill chips from the workpiece being threaded. The process of forming threads using a thread milling tool is known to those of skill in the art and, for that reason, is not described in detail herein. As an example, the thread milling tool of the present invention may be operated as described in U.S. Pat. No. 5,098,232 to form threads in a workpiece. The entire disclosure of the '232 patent is hereby incorporated herein by reference. Prior art thread milling tool designs have combined a taper angle with helically oriented flutes. Such prior art designs include thread milling tools available from Schmarje Tool Company, Muscatine, Iowa, and Scientific Cutting Tools, Inc., Simi Valley, Calif. Such prior art thread milling tool designs, however, have incorporated helical flutes with a relatively small helix angle of less than 20°. Thread milling tools with a helix angle greater than 20° have not heretofore been produced. One reason that such tools have not been produced is that it was generally believed that such tools could not be manufactured with an accurate thread form configuration. As shown herein, however, the thread milling tool of the present unexpectedly produces threads of higher quality over the service life of the tool than thread milling tools in the prior art.

The present inventors have discovered through analytical and experimental work that thread milling tools constructed according to the present invention, which incorporate flutes defined by a helix angle that is larger than the helix angle of helically fluted thread milling tools within the prior art, provides better machining performance in the form of increased chip control and evacuation, prolonged tool life, reduced cutting power consumption, and improved thread quality. The advantages provided by thread milling tools constructed according to the present invention are demonstrated experimentally by comparing the performance characteristics of prior art thread milling tools with the performance characteristics of a tapered helically fluted thread milling tool constructed according to the present invention. The tested thread milling tool within the present invention included a helix angle of approximately 30° with a thread form to produce 14 NPT threads. The tested thread milling tool is identical to that generally shown in FIGS. 1–3. The comparison was conducted with a Schmarje Tool Company type HTM490-14NPT tapered helical flute solid carbide thread milling tool and a Scientific Cutting Tools, Inc. type TM430-14NPT-HC tapered helical flute solid carbide thread milling tool. The three tested thread milling tools had identical ISO standard 14NPT threaded forms. The three tools were tested by forming internal threads in holes provided in a workpiece of AISI type 304 stainless steel using a Fadal Mill Model 906-1 operated at 20 horsepower and with the following milling conditions: 266.1 feet/minute cutting speed; 1637 revolutions/minute spindle rotation speed; 20.05 inches/minute workpiece linear travel speed; and 0.0031 inch/revolution feed rate.

Figure 4A:
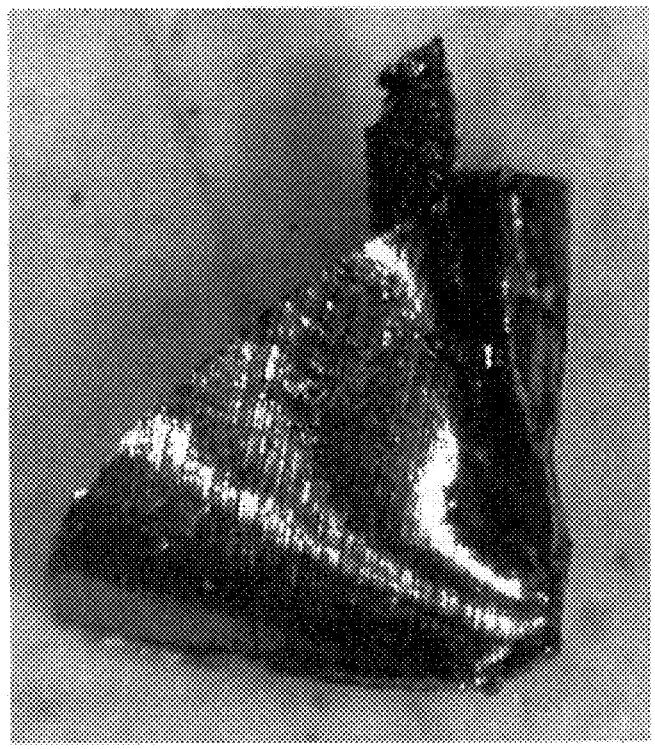
FIGS. 4(a) and 4(b) are photographs of chips produced during threading of holes in AISI type 304 stainless steel using a thread milling tool constructed according to the present invention with flutes having a helix angle of approximately 30°.
Figure 4B:
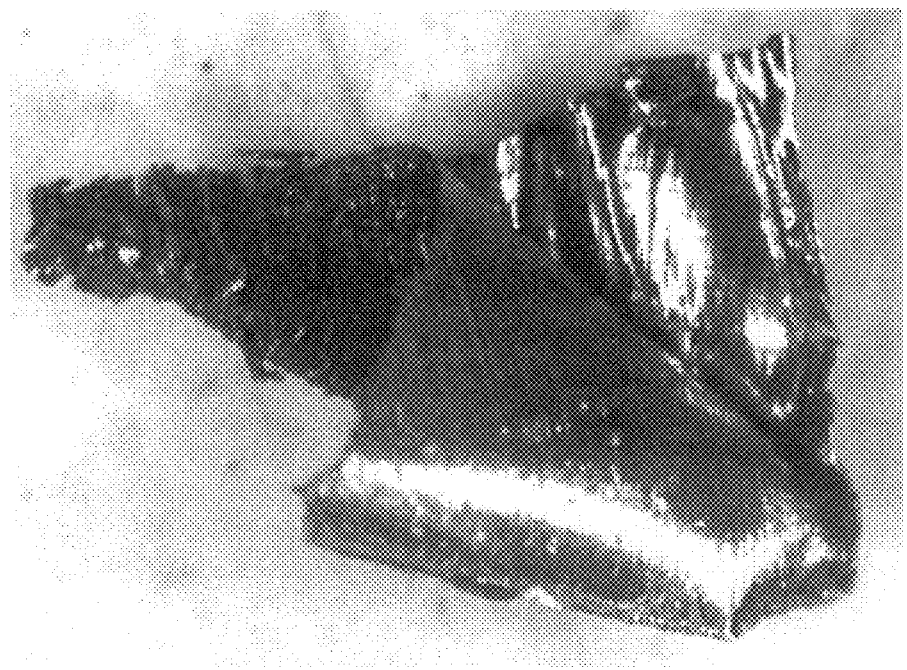
Figure 5A:
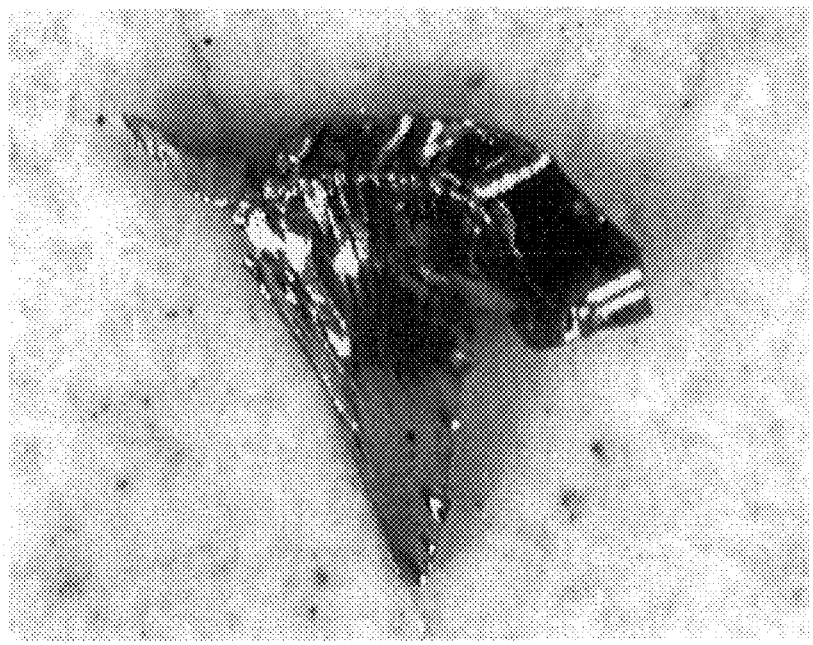
FIGS. 5(a) and 5(b) are photographs of chips produced during threading of holes in AISI type 304 stainless steel using a Schmarje Tool Company type HTM490-14NPT tapered helical flute thread milling tool having a helix angle of about 10°.
Figure 5B:
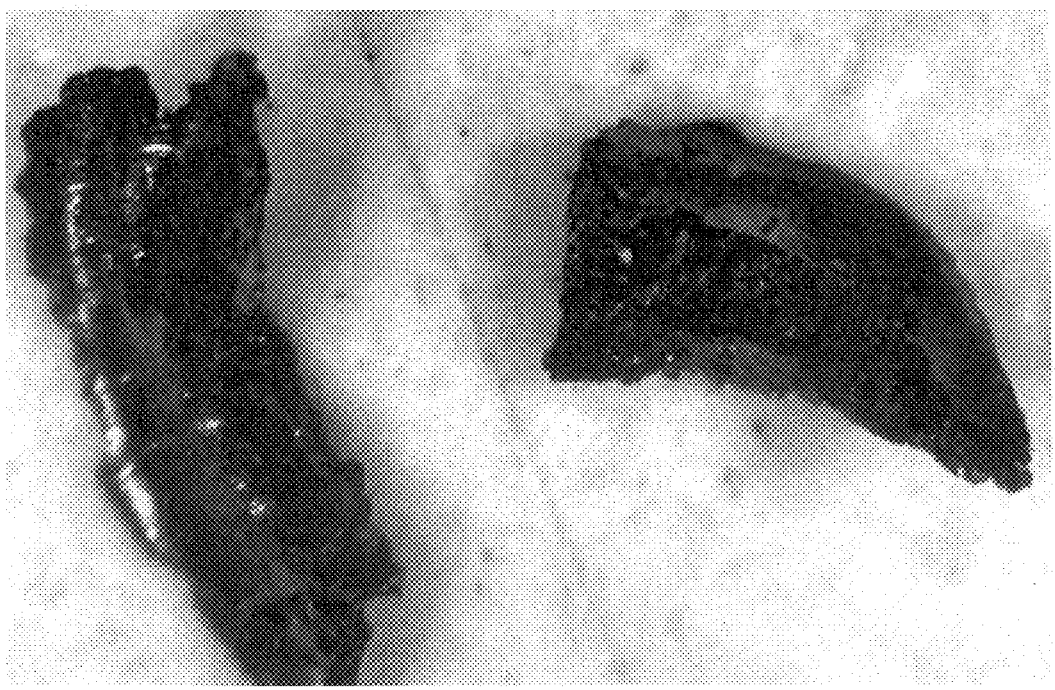
Figure 6A:
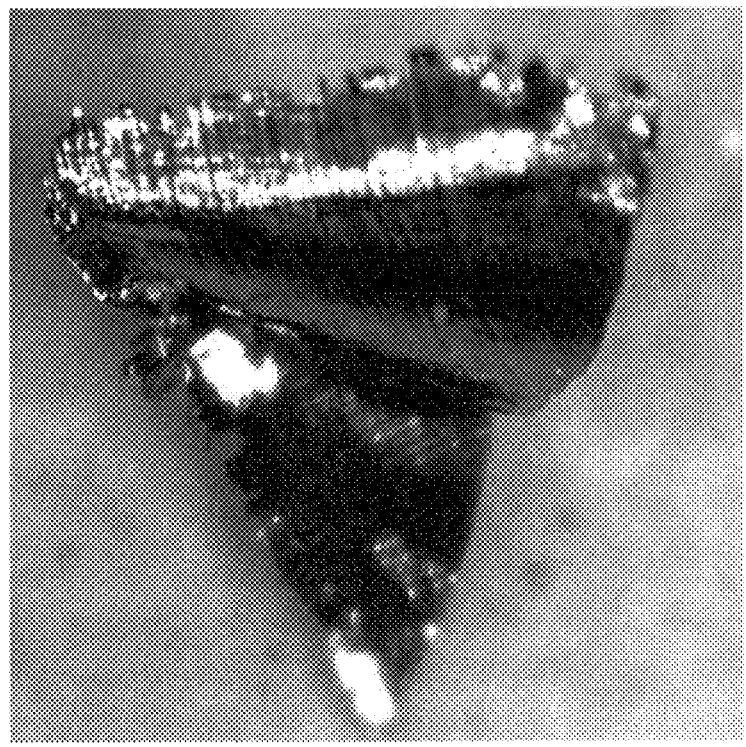
FIGS. 6(a) and 6(b) are photographs of chips produced during threading of holes in AISI type 304 stainless steel using a Scientific Cutting Tools type TM430-14NPT-HC tapered helical flute thread milling tool having a helix angle of about 15°.
Figure 6B:
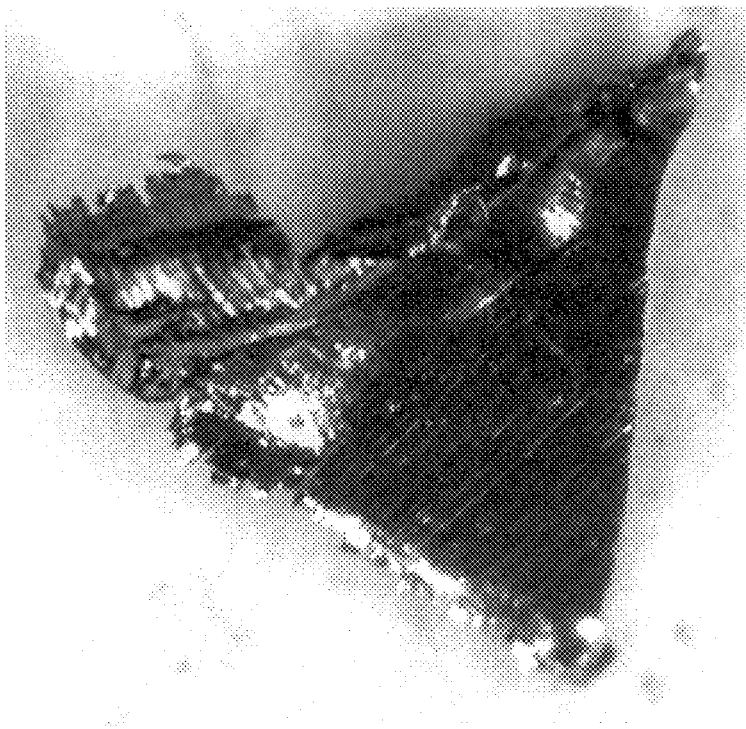

Sample chips were collected to assess the quality of chip formation using the three different milling tools. FIGS. 4(a) and (b) are photographs of chips collected on threading holes in the stainless steel work piece using the thread milling tool constructed according to the present invention. FIGS. 5(a)–(b) and 6(a)–(b) are photographs of chips collected on threading holes in the stainless steel work piece using the Schmarje Tool Company and Scientific Cutting Tools thread milling tools, respectively. All of the photographs in FIGS. 4 through 6 are at 47× magnification. Chips produced using the thread milling tool of the present invention are evidently smoother than those produced using the prior art tools. The smoother form of the chips indicates that the milling operation proceeded more smoothly, resulting in reduced power consumption, more stable threading, longer tool life, and improved thread form.

Figure 7:
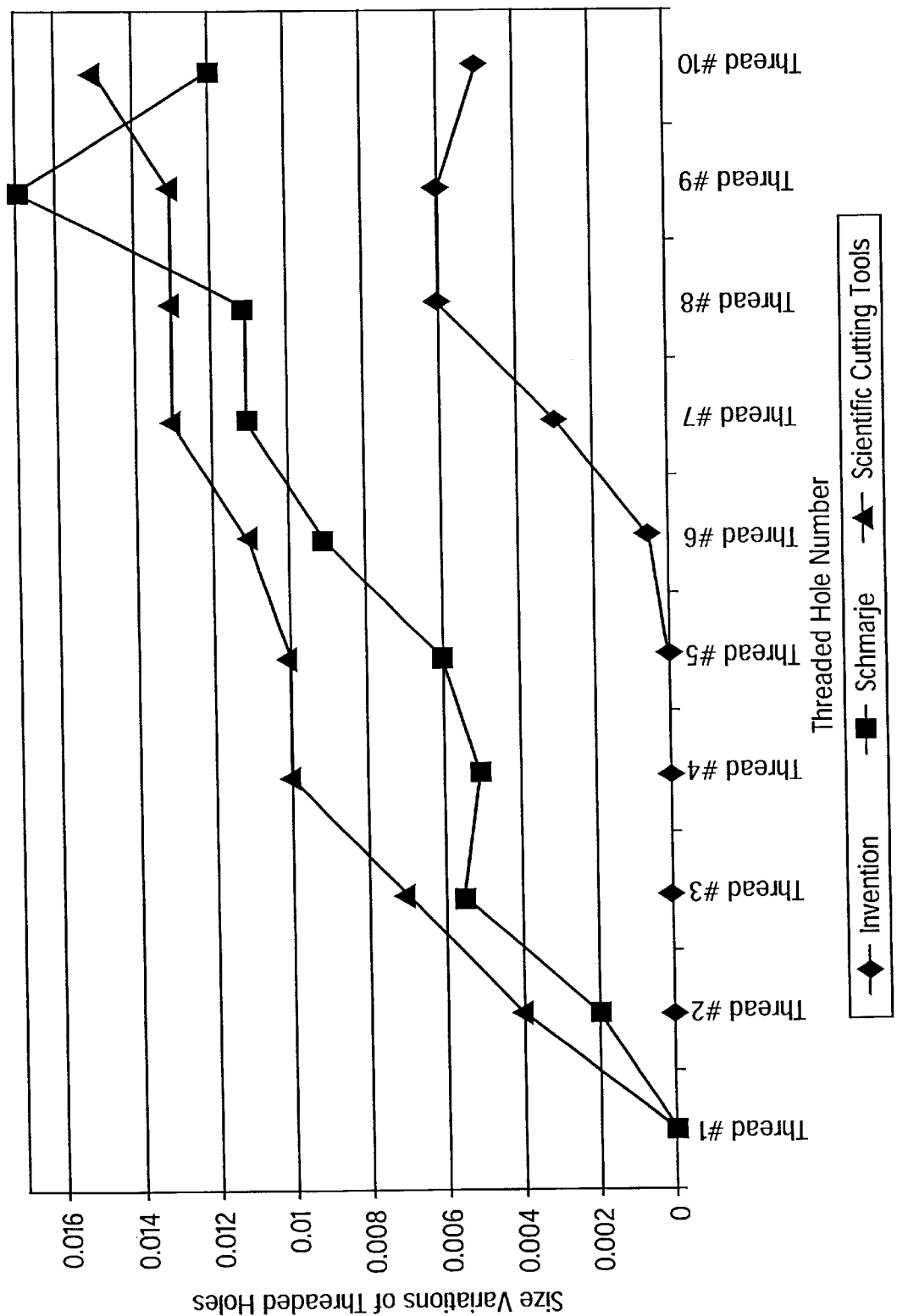
FIG. 7 is a graph illustrating variation from desired size of threaded holes threaded using prior art thread milling tools and a thread milling tool constructed according to the present invention.

FIG. 7 illustrates the variation in the quality of threads created using the three thread milling tools. A series of three sets of ten holes was provided in the AISI type 304 stainless steel workpiece. A different set of ten holes was threaded using each of three thread milling tools. One thread milling tool of each type was used to thread all ten holes of each set and no tool compensation was employed for any of the three thread milling tools. In other words, the same set up and milling parameters were used with each tool. A standard 14-NPT plug gage was then screwed into each threaded hole, and the height from the top of the plug gage to the top surface of the workpiece was measured. The inability of the plug gage to be screwed entirely into a threaded hole so as to become flush with the top of the hole indicated undesirable variation in the size of the threaded hole.

Variations from the desired thread form indicated by the plug gage testing procedure were compared. The curves shown in FIG. 7 represent the size variations experienced in each of the ten holes threaded with each thread milling tool. The progression in threading the ten threaded holes is indicated along the horizontal axis of the figure, from the first to the tenth threaded hole using each tool. The terminal depth variation of the plug gauge in the threaded holes is indicated on the vertical axis of figure. It may be seen from FIG. 7 that the extent of variation in size of threaded holes generally increases as more holes are threaded, which may be an indication of tool wear or roughened thread surface. FIG. 7 graphically shows that the thread milling tool constructed according to the present invention produced much less size variation in the threaded holes and, in fact, produced little or no size variation in the first six holes threaded. In contrast, the Schmarje Tool Company and Scientific Cutting Tools thread milling tools produced substantially greater variation in the size of the threaded holes. It may be seen that undesirable size variation in the threaded holes became apparent after just the first hole was threaded with the prior art tools. It is believed, in contrast to the belief in the art, that the greater helix angle of the tool constructed according to the present invention enhanced chip formation and ejection and generally improved the performance of the threading operation such that wear of the cutter was lessened, the thread surface of the workpiece was smoother, and the quality of the threads produced was much improved.

During the machining tests, it was observed that a higher pitched sound was produced during threading operations using the prior art thread milling tools relative to the tool constructed according to the invention. As is known in the milling arts, a higher pitched sound indicates a rougher cutting process, tool deflection, and deformation of the threads, and it follows that material is being milled from the threaded holes more efficiently by the thread milling tool of the present invention, and with relatively less power consumption.

It was also observed that the plug gage could be screwed into the threaded holes produced by the tool of the present invention much easier and with a much smoother motion relative to those produced by the prior art tools. This indicates that the threads were better formed by the present invention relative to the prior art tools. It is believed that the larger helix angle of the flutes of the tool constructed according to the present invention provides more effective chip evacuation and allowed the threads to be formed without substantial interference from chips entrapped within the hole in the work piece.

The threaded hole size variations shown in FIG. 7 indicate that the geometry of the design of the thread milling tool of the present invention provides better milling performance, including more consistent thread size and more accurate thread configuration, and also resulted in a smoother threading process generating more smoothly shaped chips, as well as a smoother surface on the threaded holes. The better threading performance provided by tools constructed according to the present invention would improve quality of threaded connections, lessen the cutting forces necessary during the thread milling operation, enhance tool life, and reduce the tendency for edge chipping on the tool during the threading process. The superiority of the tool of the present invention shown in the comparative results was unexpected and significant.

It is to be understood that the present description illustrates those aspects of the invention relevant to a clear understanding of the invention. Certain aspects of the invention that would be apparent to those of ordinary skill in the art and that, therefore, would not facilitate a better understanding of the invention have not been presented in order to simplify the present description. Although the present invention has been described in connection with certain embodiments, those of ordinary skill in the art will, upon considering the foregoing description, recognize that many modifications and variations of the invention may be employed. All such variations and modifications of the invention are intended to be covered by the foregoing description and the following claims. In particular, although only a single embodiment of the invention having a helix angle of about 30° was presented, it will be understood that thread mills within the present invention including any other suitable helix angle greater than 20° may be provided and are encompassed by the following claims.

What is claimed is:

1. A thread milling tool comprising:

a proximal shank portion;

a distal cutting portion comprising a plurality of complete thread milling teeth defining a taper angle; and at least one helically oriented flute defined in said cutting portion, wherein said helical flute is defined by a helix angle of at least 20°.

2. The thread milling tool of claim 1 wherein said shank portion is attachable to a device for translating the thread milling tool to form threads on a workpiece.

3. The thread milling tool of claim 2 wherein the thread milling teeth have a thread form which produces threads on the work piece conforming to National Pipe Thread standards.

4. The thread milling tool of claim 1 wherein no more than six helical flutes are defined in said cutting portion.

5. The thread milling tool of claims 1 wherein said helical flute is defined by a helix angle less than 40°.

6. The thread milling tool of claim 1 further comprising a bore through said shank portion and said cutting portion for directing a coolant flow to said cutting portion.

7. The thread milling tool of claim 1 wherein said helical flute is defined by a helix angle of 30°.

8. The thread milling tool of claim 1 wherein said shank portion comprises a Weldon shank.

9. The thread milling tool of claim 1 wherein said shank portion comprises a locating slot.

10. The thread milling tool of claim 2 wherein the device is a computer numerically controlled machine.

* * * * *

UNITED STATES PATENT AND TRADEMARK OFFICE
CERTIFICATE OF CORRECTION

PATENT NO. : 6,345,941 B1
DATED : August 20, 2002
INVENTOR(S) : White

It is certified that error appears in the above-identified patent and that said Letters Patent is hereby corrected as shown below:

<u>Title page,</u>
Item [73], Assignee, please change "Appllied" to -- Applied --.

<u>Column 2,</u>
Line 11, please change "lanarization" to -- planarization--.

Signed and Sealed this

First Day of July, 2003

JAMES E. ROGAN
*Director of the United States Patent and Trademark Office*

UNITED STATES PATENT AND TRADEMARK OFFICE
CERTIFICATE OF CORRECTION

PATENT NO.     : 6,345,941 B1                                          Page 1 of 1
DATED          : February 12, 2002
INVENTOR(S)    : X. Daniel Fang et al.

It is certified that error appears in the above-identified patent and that said Letters Patent is hereby corrected as shown below:

This certificate supersedes Certificate of Correction issued July 1, 2003, the number was erroneously mentioned and should be vacated since no Certificate of Correction was granted.

Signed and Sealed this

Thirtieth Day of September, 2003

JAMES E. ROGAN
*Director of the United States Patent and Trademark Office*